(12) United States Patent
Hanafusa et al.

(10) Patent No.: US 11,914,868 B2
(45) Date of Patent: Feb. 27, 2024

(54) STORAGE SYSTEM, METHOD FOR MOVING DRIVES, AND NON-TRANSITORY COMPUTER-READABLE MEDIUM

(71) Applicant: Hitachi, Ltd., Tokyo (JP)

(72) Inventors: Ryo Hanafusa, Tokyo (JP); Tomohiro Yoshihara, Tokyo (JP); Ryosuke Tatsumi, Tokyo (JP); Hiroki Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/902,767

(22) Filed: Sep. 2, 2022

(65) Prior Publication Data

US 2023/0244387 A1 Aug. 3, 2023

(30) Foreign Application Priority Data

Jan. 31, 2022 (JP) .................................. 2022-013175

(51) Int. Cl.
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0683* (2013.01)

(58) Field of Classification Search
CPC .... G06F 3/0683; G06F 3/0689; G06F 3/0601; G06F 3/0604; G06F 3/0605; G06F 3/0607; G06F 3/0628; G06F 3/0608; G06F 3/0611; G06F 3/0613; G06F 3/0614; G06F 3/0617; G06F 3/0629; G06F 3/0634; G06F 3/0635; G06F 3/0646; G06F 3/0647; G06F 2212/262; G06F 11/1076; G06F 11/1092
See application file for complete search history.

(56) References Cited

U.S. PATENT DOCUMENTS

| | | | |
|---|---|---|---|
| 9,448,735 B1* | 9/2016 | Proulx | G06F 3/0632 |
| 2006/0015697 A1* | 1/2006 | Morishita | G06F 3/0659 |
| | | | 711/162 |
| 2007/0260840 A1* | 11/2007 | Watanabe | G06F 11/0727 |
| | | | 711/165 |
| 2016/0291899 A1* | 10/2016 | Takamura | G06F 3/067 |

(Continued)

FOREIGN PATENT DOCUMENTS

JP 2016-192170 A 10/2016
JP 2021-140402 A 9/2021

*Primary Examiner* — Tracy A Warren
(74) *Attorney, Agent, or Firm* — Procopio, Cory, Hargreaves & Savitch LLP

(57) ABSTRACT

A storage system comprises nodes and drives, and includes at least one mounting area to install the drives. A node manages a parity group constituted of the plurality of drives; generates, in a case where a target drive that is installed in a first mounting area and that belongs to a first parity group is to be moved from the first mounting area to a second mounting area, difference information regarding a storage area where data was written into the target drive during a period in which the target drive is moved from the first mounting area to the second mounting area; and restore data written into the storage area by using data stored in other drives than the target drive that belongs to the first parity group based on the difference information, and write the data into the target drive that has been moved to the second mounting area.

6 Claims, 13 Drawing Sheets

(56) References Cited

U.S. PATENT DOCUMENTS

2021/0278989 A1\* 9/2021 Matsugami ............ G06F 3/0647
2022/0236884 A1\* 7/2022 Zhang ................... G06F 3/0647
2022/0358020 A1\* 11/2022 Nehse ................... G06F 3/0619

\* cited by examiner

| 301 | 302 | 303 | 304 | 305 |
|---|---|---|---|---|
| DRIVE NUMBER | DRIVE IDENTIFICATION INFORMATION | MOVEMENT STATE | LOCATION | BELONGING PG NUMBER |
| 0x0 | DKS5K-J2R4SS, WBM06EJ7 | MOVING | HDD01_00 | PG_0 |
| 0x1 | DKS5K-J2R4SS, WBM06EJ8 | MOVED | HDD01_01 | PG_0 |
| 0x2 | DKS5K-J2R4SS, WBM06EJ9 | WAITING FOR REBUILD | HDD02_00 | PG_10 |

*FIG. 3*

| 401 | 402 | 153 |
|---|---|---|
| DRIVE NUMBER | UPDATED BIT MAP | |
| 0x0 | 0x 0FFF 0004 8000 0000... | |
| 0x1 | 0x 01F8 03FF C000 0001... | |
| 0x2 | 0x 0001 FC00 00C0 03C0... | |

STORAGE SYSTEM, METHOD FOR MOVING DRIVES, AND NON-TRANSITORY COMPUTER-READABLE MEDIUM

CLAIM OF PRIORITY

The present application claims priority from Japanese patent application JP 2022-13175 filed on Jan. 31, 2022, the content of which is hereby incorporated by reference into this application.

BACKGROUND

The present invention relates to a method for moving drives in a storage system.

In storage systems, components such as drives, controllers, and nodes are replaced for maintenance and performance improvement. It is preferable that component replacement be performed while maintaining the current operation state. For technologies regarding component replacement in a storage system, Japanese Patent Application Laid-open Publication No. 2021-140402 and Japanese Patent Application Laid-open Publication No. 2016-192170 are known.

Japanese Patent Application Laid-open Publication No. 2021-140402 describes "a storage system including a storage controller and a storage drive having a storage medium, wherein the storage controller has data management information to access data stored in the storage drive, wherein a first storage controller copies the data management information for data stored in the storage drive into a second storage controller, and wherein, upon receiving a write request from a host after the process to copy the data management information has started, the first storage controller and the second storage controller respectively store the write data for the write request in a separate storage area of the storage drive".

Japanese Patent Application Laid-open Publication No. 2016-192170 describes "a storage control device including a reception unit, a determining unit, and a transfer unit, wherein the reception unit receives information specifying a target volume to be transferred from an originating storage to a destination storage among a plurality of volumes including a plurality of pieces of divided data disposed in a plurality of storages, wherein the determining unit determines a layout of divided data of the target volume to be placed in the originating storage, based on the number of divided data that can be placed in the originating storage and the number of divided data of the target volume, and wherein the transfer unit places the divided data of the target volume based on the determined layout, and transfers the plurality of divided data collectively to the destination storage.

SUMMARY

The technique described in Japanese Patent Application Laid-open Publication No. 2021-140402 does not disclose to replacement of components that have a drive installed therein. With the technique described in Japanese Patent Application Laid-open Publication No. 2016-192170, a new node must have a storage device, and since all of the data in the node to be replaced needs to be copied to a new node, it has a problem of requiring a great deal of time and efforts.

The present invention realizes a technology to change the configuration inside the storage system without stopping the operation by using existing drives effectively.

A representative example of the present invention disclosed in this specification is as follows: a storage system, comprises a plurality of nodes, and a plurality of drives, and includes at least one mounting area to install the plurality of drives. At least one of the plurality of nodes is configured to: manage a parity group constituted of the plurality of drives; control data reading and data writing from/to the plurality of drives; perform, in a case where a target drive that is installed in a first mounting area and that belongs to a first parity group is to be moved from the first mounting area to a second mounting area, a first process for generating difference information regarding a storage area where data was written into the target drive during a period in which the target drive is moved from the first mounting area to the second mounting area; and perform a second process for restoring data written into the storage area by using data stored in other drives than the target drive that belongs to the first parity group based on the difference information, and writing the restored data into the target drive that has been moved to the second mounting area.

According to the present invention, it is possible to change the configuration inside the storage system without stopping the operation by using existing drives effectively. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 is a diagram showing an example of the data configuration of drive management information according to Embodiment 1;

DETAILED DESCRIPTION OF THE EMBODIMENTS

Figures 1, 2:
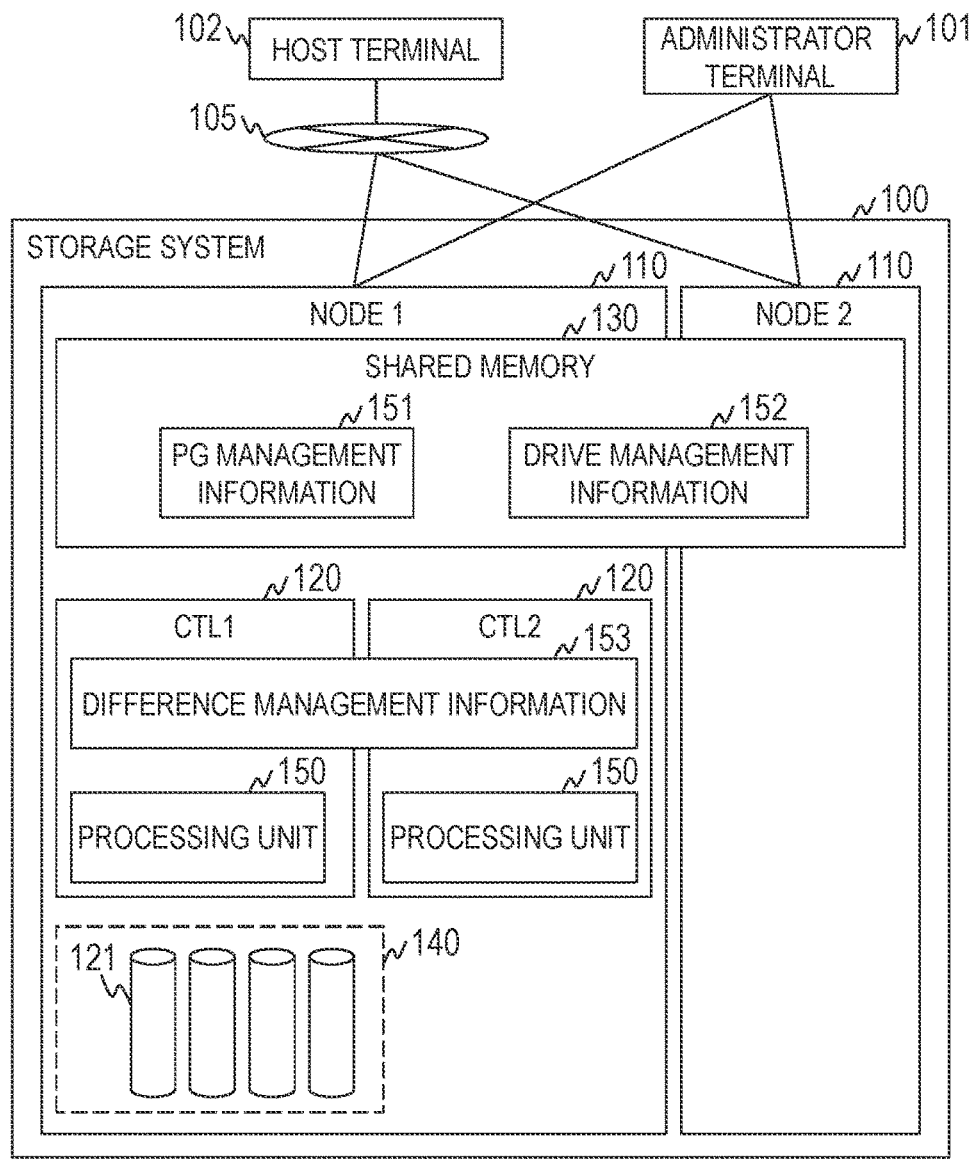
FIG. 1 is a diagram illustrating a configuration example of a system according to Embodiment 1.
FIG. 2 is a diagram showing an example of the data configuration of PG management information according to Embodiment 1.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

Embodiment 1

FIG. 1 is a diagram illustrating a configuration example of a system according to Embodiment 1.

The system illustrated in FIG. 1 includes a storage system 100, an administrator terminal 101, and a host terminal 102. The administrator terminal 101 and the host terminal 102 are coupled to the storage system 100 via a network 105. The network 105 is, for example, a wide area network (WAN), a local area network (LAN), a storage area network (SAN), and like. The method of coupling to the network 105 may be any one of a wired manner or a wireless manner. The network coupling the administrator terminal 101 to the storage system 100 may differ from the network coupling the host terminal 102 to the storage system 100.

The administrator terminal 101 is a computer for managing the storage system 100. The administrator of the storage system 100 uses the administrator terminal 101 to set and control the storage system 100.

The host terminal 102 is a computer utilizing the storage system 100. The host terminal 102 writes user data in the storage system 100 and reads user data from the storage system 100.

The storage system 100 provides volumes to the host terminal 102. The storage system 100 generates a parity group (PG) 140 constituting redundant arrays of inexpensive disks (RAID) from a plurality of drives 121, and generates a volume from the PG 140. The devices 121 is, for example, a hard disk drive (HDD) and a solid-state drive (SSD). The volume is an LDEV, for example.

The storage system 100 includes a plurality of nodes 110. The plurality of nodes 110 are coupled to each other via an internal network constituted of switches and the like (not shown).

The nodes 110 control transmission and reception of user data between the host terminal 102 and the drives 121, and controls reading and writing of user data to/from the drives 121. The nodes 110 each have at least one storage controller (CTL) 120. The nodes 110 each have an interface (not shown) for installing the drives 121.

In the descriptions below, when it is necessary to distinguish an individual node 110 or CTL 120 from other nodes 110 or CTLs 120, it will be written as a node (i) 110 or CTL (i) 120, where (i) is an integer of 1 or greater.

For the hardware configuration, the CTL 120 includes a CPU, a memory a channel board (CHB), a disk board (DKB), and the like, which are not shown. For the functional configuration, the CTL 120 has a processing unit 150 that controls transmission, reception, reading, and writing of user data. The CTL 120 in the node 110 manages difference management information 153. The difference management information 153 is information for managing data copying associated with the movement of the installation location of the drives 121. The difference management information 153 will be explained in detail with reference to FIG. 4.

The respective nodes 110 in the storage system 100 constitute a shared memory 130. The shared memory 130 stores PG management information 151 and drive management information 152. The PG management information 151 is information for managing the PG 140. The PG management information 151 will be explained in detail with reference to FIG. 2. The drive management information 152 is information for managing the drives 121 installed in the storage system 100. The drive management information 152 will be explained in detail with reference to FIG. 3.

In Embodiment 1, drives 121 are installed in the node 110, and the PG 140 is constituted of a group of drives 121 of at least one node 110.

FIG. 2 is a diagram showing an example of the data configuration of the PG management information 151 according to Embodiment 1.

The PG management information 151 stores entries including a PG number 201 and a drive list 202. One entry corresponds to one PG 140. The fields included in one entry are not limited to those described above.

The PG number 201 is a field to store an identification number of the PG 140. The drive list 202 is a field to store information of the drives 121 constituting the PG 140. The drive list 202 stores a list of drive numbers for identifying the drives 121 installed the storage system 100.

FIG. 3 is a diagram showing an example of the data configuration of the drive management information 152 according to Embodiment 1.

The drive management information 152 stores entries including a drive number 301, drive identification information 302, a movement status 303, a location 304, and a belonging PG number 305. One entry corresponds to one drive 121. The fields included in one entry are not limited to those described above.

The drive number 301 is a field to store a drive number. The drive identification information 302 is a field to store identification information for uniquely identifying the drive 121. The movement state 303 is a field to store a value indicating the state of the drive 121 regarding movement. The movement state 303 has stored therein one of "Moved" indicating that the installation location of the drive 121 has been moved, "Moving" indicating that the installation location of the drive 121 has been changed but not been recognized, and "Waiting for rebuild" indicating that the installation location of the drive 121 has been changed and rebuild has not been completed. The location 304 is a field to store the installation location of the drive 121. The belonging PG number 305 is a field to store an identification number of the PG 140 to which the drive 121 belongs.

Figures 4, 5A:
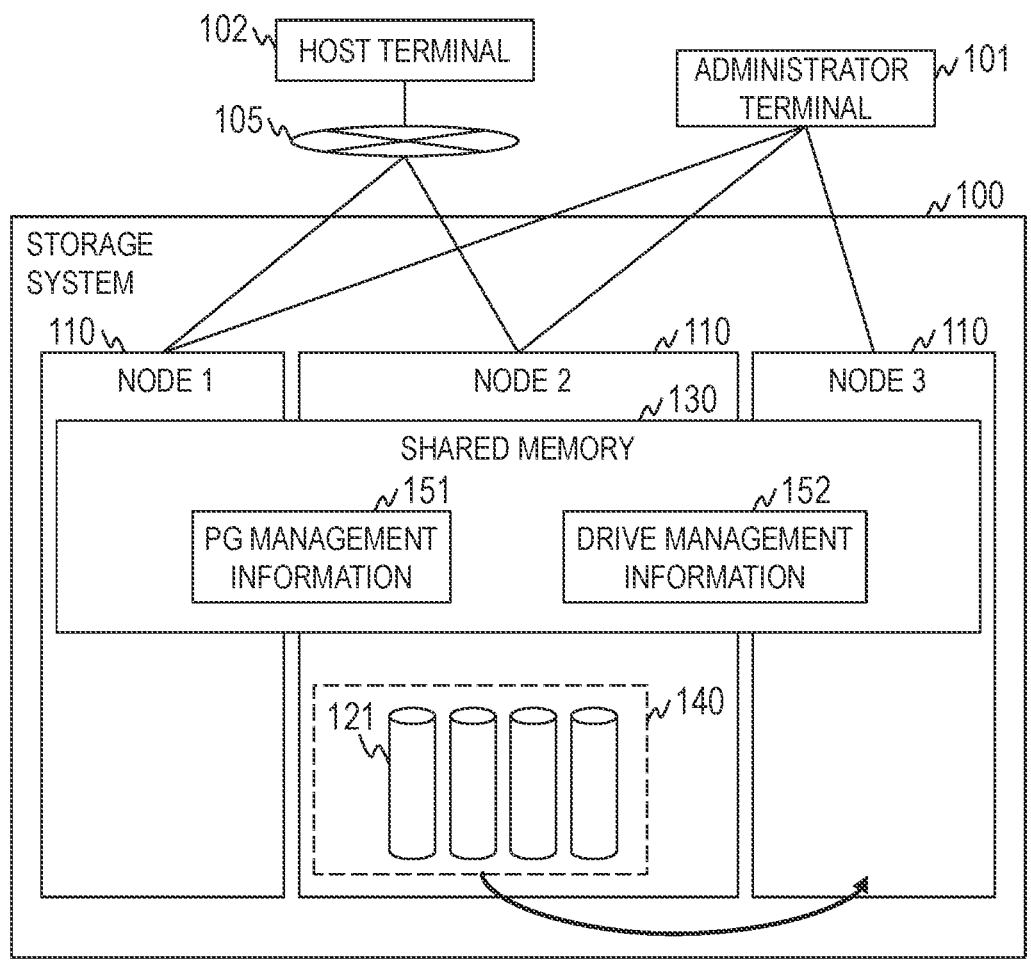
FIG. 4 is a diagram showing an example of the data configuration of difference management information according to Embodiment 1.
FIGS. 5A and 5B are diagrams illustrating a movement example of drives of a storage system according to Embodiment 1.

FIG. 4 is a diagram showing an example of the data configuration of the difference management information 153 according to Embodiment 1.

The difference management information 153 stores entries including a drive number 401 and an updated bit map 402. One entry corresponds to one drive 121 that has changed the installation location.

The drive number 401 is a field to store a drive number of the drive 121 that has changed the installation location. The updated bit map 402 is a field to store an updated bit map for identifying the location of updated data of the drive 121 in a case where the installation location is being moved. The updated bit map is, for example, a bit map that treats a storage area whose size is 512 MB as one bit. The size of the storage area per one bit may be set appropriately.

Figure 5B:
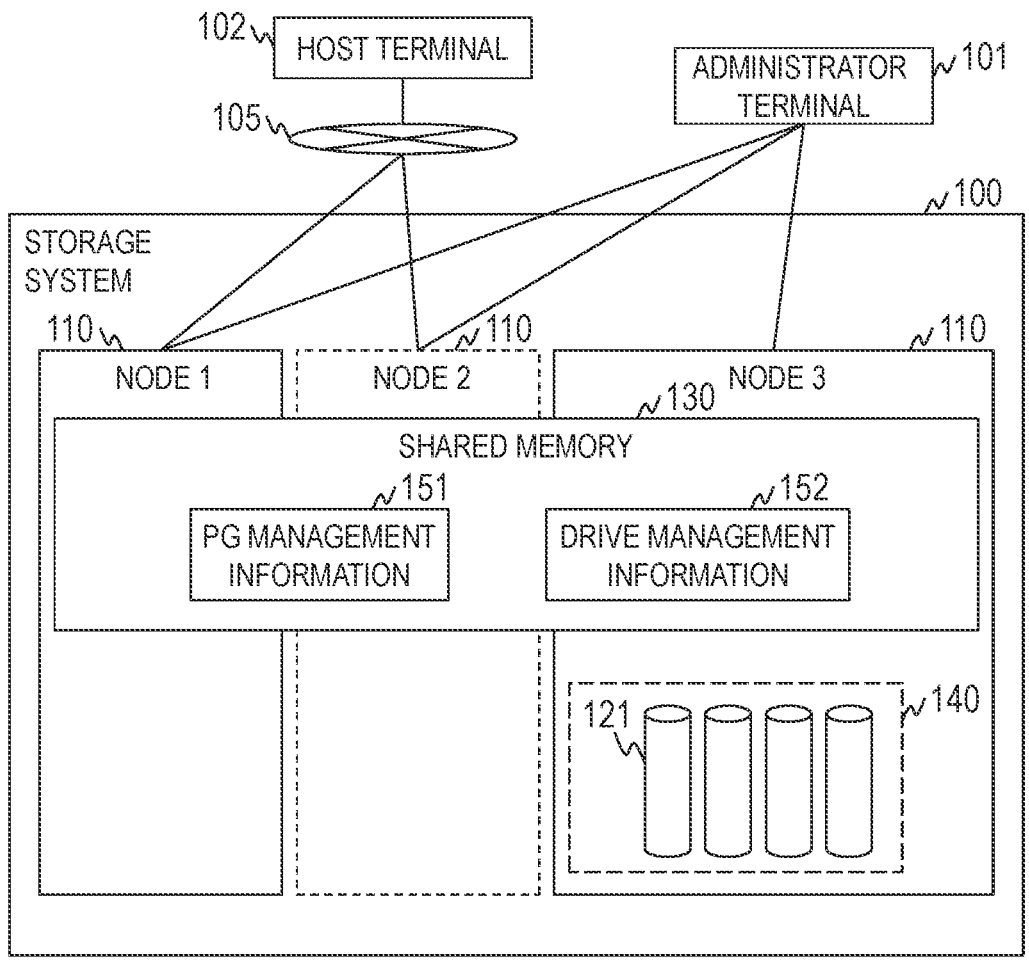
Figure 6A:
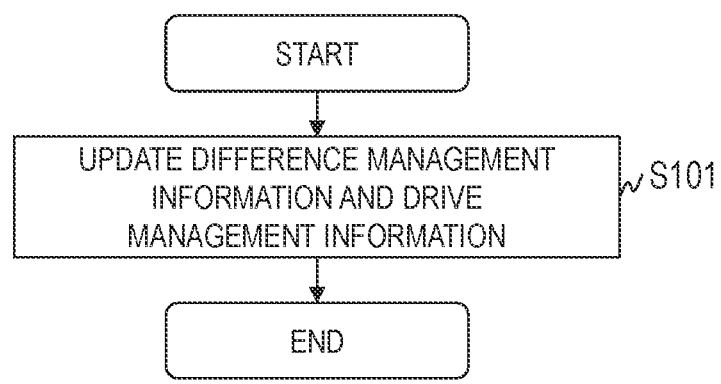
FIGS. 6A, 6B, and 6C are a flowchart explaining one example of drive movement process of the storage system according to Embodiment 1.
Figure 6B:
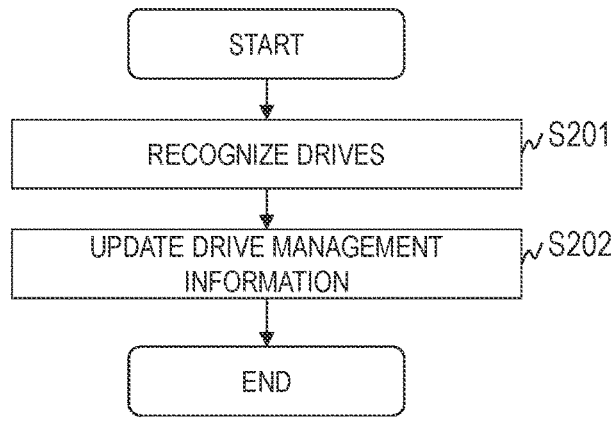
Figure 6C:
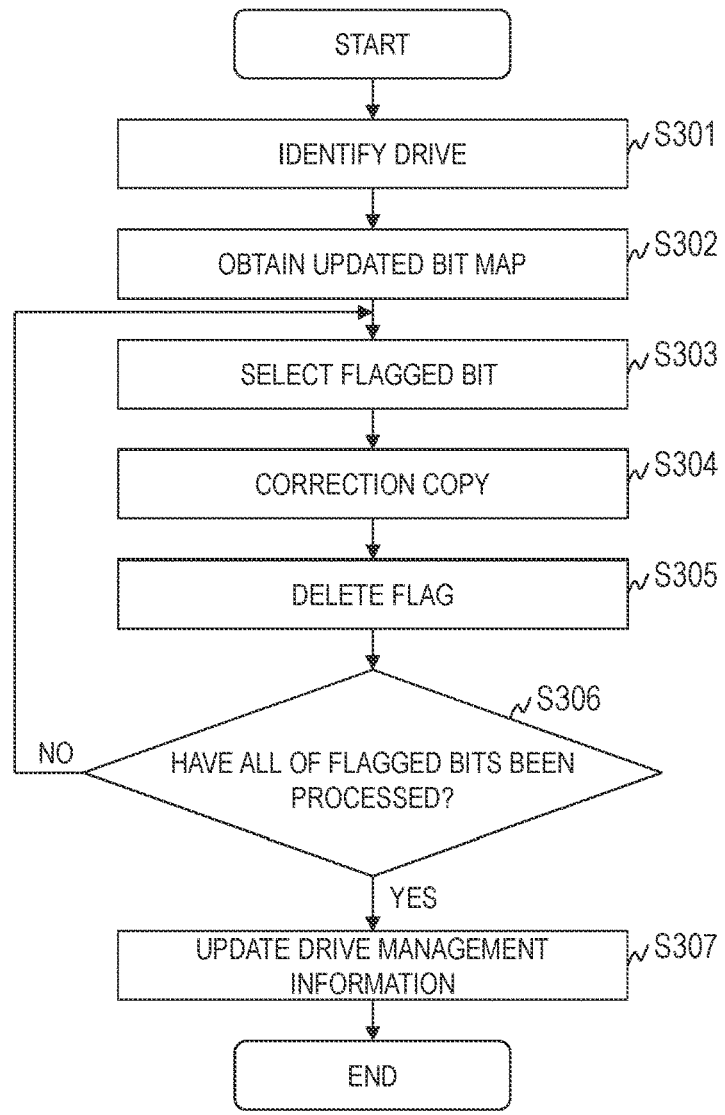

FIGS. 5A and 5B are diagrams illustrating a movement example of the drives 121 of the storage system 100 according to Embodiment 1. FIGS. 6A, 6B, and 6C are a flowchart explaining one example of the drive movement process of the storage system 100 according to Embodiment 1.

Explained in Embodiment 1 is the control of the storage system 100 in a case where a node (3) 110 is added to the storage system 100, and a group of drives 121 installed in the node (2) 110 and constituting the PG 140 are to be moved to the node (3) 110. First, the administrator or the like adds the node (3) to the storage system 100.

The administrator or the like confirms whether there are drives 121 that they wish to move to another installation location. In a case where there are drives 121 to be moved, the administrator or the like transmits a drive movement command using the administrator terminal 101. The drive movement command includes drive numbers that specify the drives 121 to be moved.

In the descriptions below, the drives 121 to be moved to another installation location will be referred to as target drives 121.

In a case of receiving the drive movement command, the processing unit 150 of the node (2) 110 updates the drive management information 152 and the difference management information 153 (Step S101).

Specifically, the processing unit 150 retrieves entries of the target drives 121 from the drive management information 152, and sets the movement state 303 of the retrieved entries to "Moving". The processing unit 150 adds entries to the difference management information 153, and set the drive number 401 of the added entries to the drive number of the target drives 121, and sets the updated bit map 402 to an initialized bit map. Here, the initialized bit map refers to a state in which flags for all bits have been deleted.

After the process of Step S101, the administrator or the like removes a prescribed number of drives 121 within the scope of redundancy from the node (2) 110, and installs those drives 121 in the node (3) 110.

After all of the drives to be moved have been moved, the administrator or the like changes the path to the host terminal 102 and the ownership of LDEV to the node (3) 110.

The processing unit 150 of the node (3) 110 recognizes the installed drives 121 (Step S201), and obtains identification information and the like from the drives 121.

The processing unit 150 of the node (3) 110 updates the drive management information 152 (Step S202), and ends the process.

Specifically, the processing unit 150 retrieves entries of the recognized drives 121 from the drive management information 152, and obtains the value of the movement state 303 of those entries. In a case where the value of the movement state 303 of one entry is "Moving", the processing unit 150 sets the location 304 of the entry to the current installation location, and sets the movement state 303 to "Waiting for rebuild".

A rebuild execution node 110 performs the process illustrated in FIG. 6C. The rebuild execution node 110 may be the source node or destination node of the drives 121, or may be a node 110 with a low load in the storage system 100.

The processing unit 150 of the rebuild execution node 110 refers to the drive management information 152 to identify the drive 121 for which the movement state 303 is "Waiting for rebuild" (Step S301).

The processing unit 150 of the rebuild executing node 110 transmits a query for the difference management information 153 including the drive identification information of the identified drive 121, thereby obtaining the updated bit map (Step S302).

The processing unit 150 of the rebuild executing node 110 selects one bit from the bits in the updated bit map where flags are set (Step S303).

The processing unit 150 of the rebuild executing node 110 executes correction copy on the storage area of the target drive 121 corresponding to the selected bit, using the dives 121 constituting the PG 140 (Step S304). The target drive 121 is not included in the drives 121 used for the correction copy.

In this embodiment, the correction copy is not performed for all of the drive 121, but only on the updated areas during the movement of the drives.

The processing unit 150 of the rebuild execution node 110 deletes the flag for the selected bit (Step S303).

The processing unit 150 of the rebuild execution node 110 determines whether all of the bits with flags have been processed or not (Step S306).

In a case where the process has not been performed on all of the bits with flags set, the processing unit 150 of the rebuild execution node 110 returns to Step S303 and repeats the same process.

In a case where the process has been performed on all of the bits with flags, the processing unit 150 of the rebuild execution node 110 updates the drive management information 152 (Step S307), and ends the process.

Specifically, the processing unit 150 sets the movement state 303 of the entry of the identified drive 121 of the drive management information 152 to "Moved".

In a case where a plurality of drives 121 have been identified in Step S301, the process of Step S302 through Step S307 is performed on each drive 121.

In a case where the drive 121 is to be moved, the administrator issues a command to move the drive 121 using the administrator terminal 101. This causes the processes of FIGS. 6A, 6B, and 6C to be performed.

Figure 7:
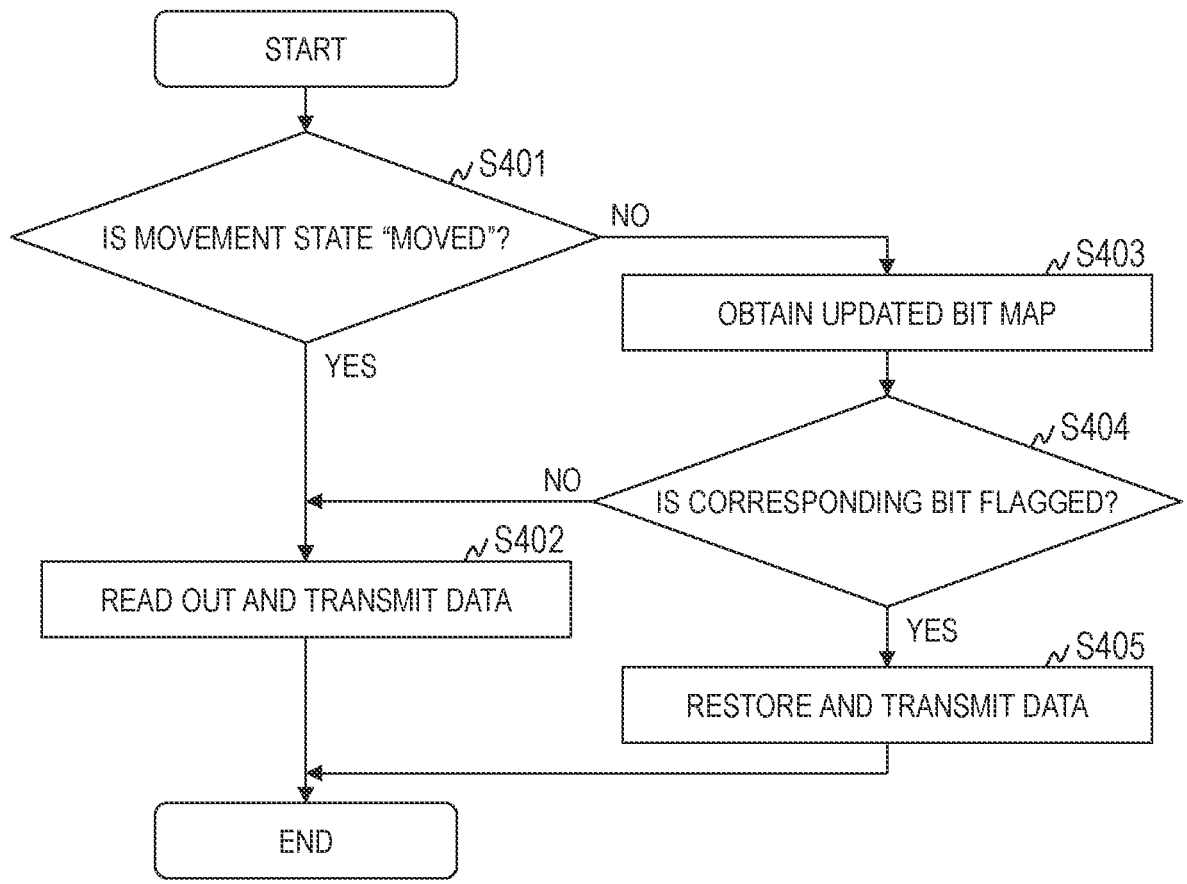
FIG. 7 is a flowchart for explaining one example of reading process executed by the storage system according to Embodiment 1.

FIG. 7 is a flowchart for explaining one example of the reading process executed by the storage system 100 according to Embodiment 1.

In a case of receiving a read request, the processing unit 150 identifies the drive 121 to access, and refers to the drive management information 152 to determine whether the movement state 303 of the entry corresponding to the drive 121 is "Moved" or not (Step S401).

In a case where the movement state 303 of the entry corresponding to the identified drive 121 is "Moved", the processing unit 150 reads the data out from the identified drive 121, and transmits the data to the requestor (Step S402).

In a case where the movement state 303 of the entry corresponding to the identified drive 121 is not "Moved", the processing unit 150 obtains the updated bit map of the identified drive 121 (Step S403), and determines whether a flag is set for the bit corresponding to the storage area including the address of the destination location or not (Step S404).

In a case where a flag is not set for the bit corresponding to the storage area including the address of the destination location, the processing unit 150 reads the data out from the identified drive 121, and transmits the data to the requestor (Step S402).

In a case where a flag is set for the bit corresponding to the storage area including the address of the destination location, the processing unit 150 obtains data from another drives 121 included in the PG 140 to which the identified drive 121 belongs, restores data, and transmits the restored data to the requestor (Step S405).

Figure 8:
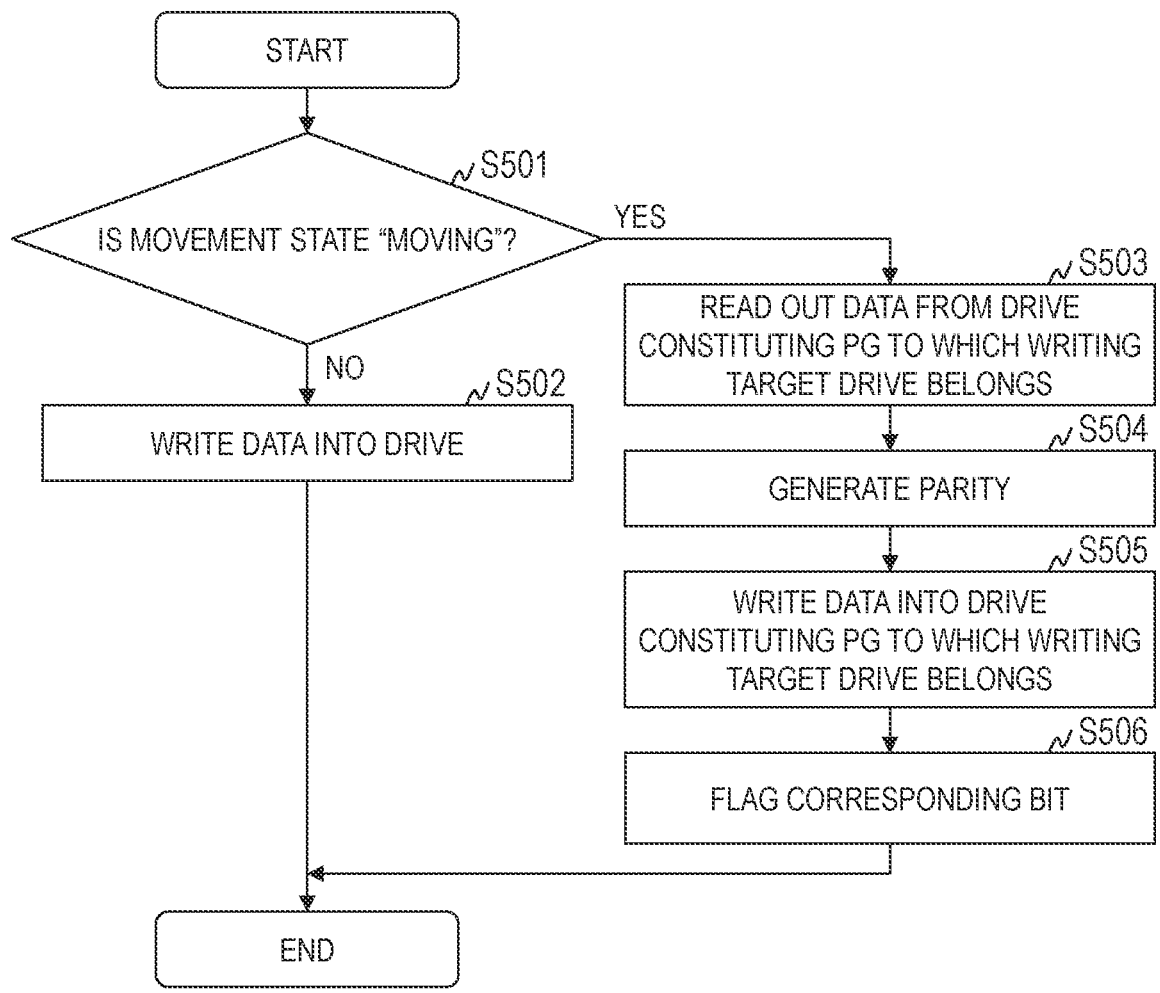
FIG. 8 is a flowchart for explaining one example of writing process executed by the storage system according to Embodiment 1.

FIG. 8 is a flowchart for explaining one example of the writing process executed by the storage system 100 according to Embodiment 1.

In a case of receiving a write request, the processing unit 150 writes data into a cache, and in a case where the remaining capacity of the cache becomes smaller than a threshold value, the processing unit 150 writes the data into the drive 121. First, the processing unit 150 identifies the drive 121 to which the data is written, and refers to the drive management information 152 to determine whether the movement state 303 of the entry corresponding to the identified drive 121 is "Moving" or not (Step S501).

In the descriptions below, the drive 121 to which the data is written will be referred to as a target drive 121.

In a case where the movement state 303 of the entry corresponding to the target drive 121 is not "Moving", the processing unit 150 writes the data into the target drive 121 (Step S502).

In a case where the movement state 303 of the entry corresponding to the target drive 121 is "Moving", the processing unit 150 reads the data out from the drives 121 that constitute the PG 140 to which the target drive 121 belongs (Step S503). At this time, the drives 121 with the movement state 303 being "Moving" or "Waiting for rebuild" are excluded. That is, the processing unit 150 reads the data out from the drives 121 constituting the PG 140 and with the movement state 303 being "Moved".

The processing unit 150 generates a parity using the write-in data and the read-out data (Step S504).

The processing unit 150 writes the write-in data and the parity in the drives 121 constituting the PG 140 including the drive 121 in which the data is to be written (Step S505). At this time, the drives 121 with the movement state 303 being "Moving" are excluded. That is, the processing unit 150 writes the data in the drives 121 constituting the PG 140 and with the movement state 303 being other than "Moving".

The processing unit 150 refers the updated bit map of the target drive 121 and sets a flag for the bit corresponding to the storage area including the address in which the data is to be written (Step S506).

Figure 9:
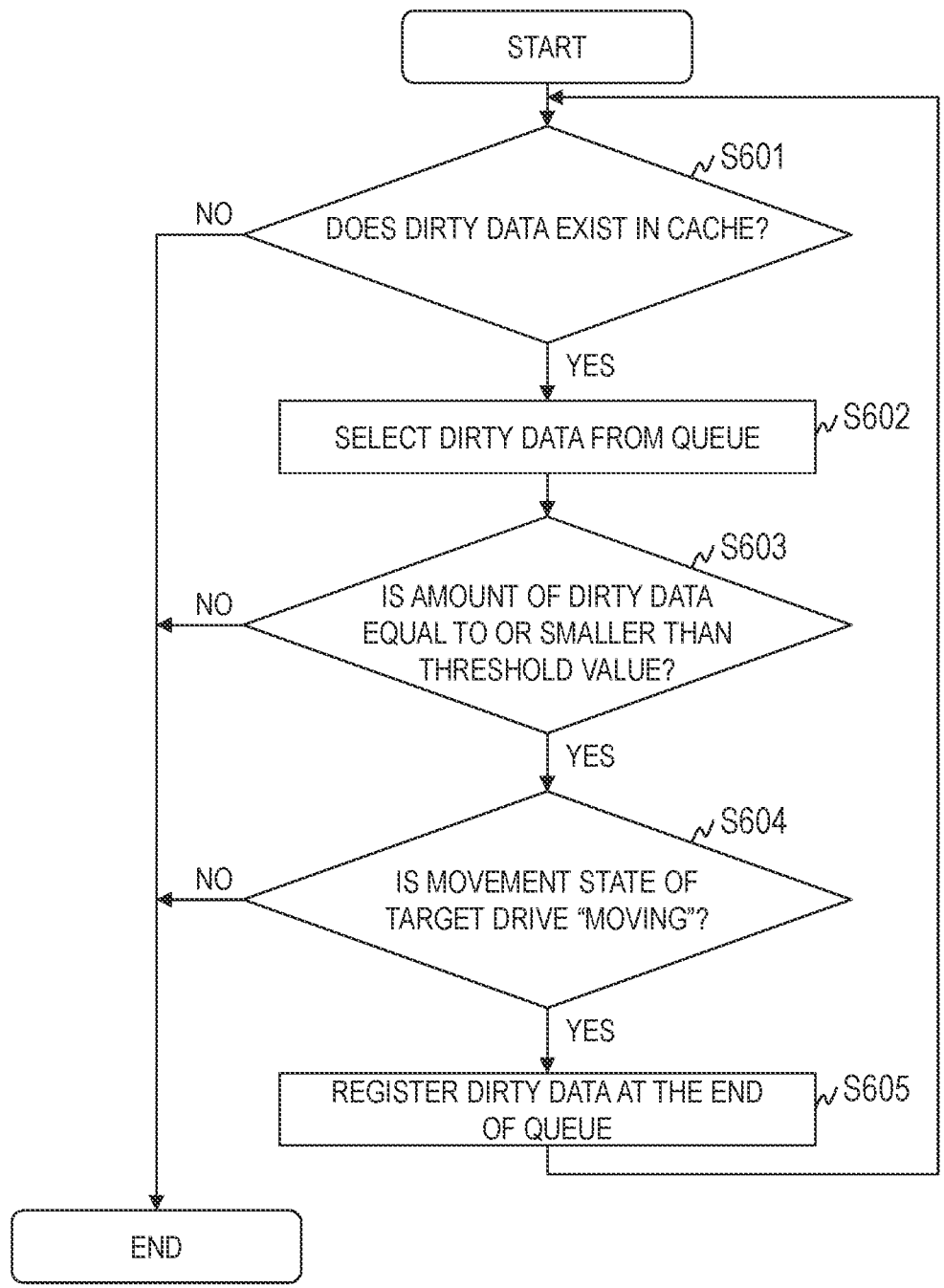
FIG. 9 is a flowchart for explaining one example of cache control of the storage system according to Embodiment 1.

FIG. 9 is a flowchart for explaining one example of cache control of the storage system 100 according to Embodiment 1.

The processing unit 150 of each node 110 performs the cache control described below periodically or upon receiving the execution command. In this embodiment, the cache control is performed using the least recently used (LRU) method.

The processing unit 150 of the node 110 determines whether the cache includes dirty data or not (Step S601).

In a case where the cache does not include dirty data, the processing unit 150 ends the process.

In a case where the cache includes dirty data, the processing unit 150 selects dirty data from a queue managing the dirty data (Step S602). A plurality of pieces of dirty data is registered in the queue in order of access time, and the processing unit 150 selects a piece of dirty data with the oldest access time.

The processing unit 150 determines whether the data amount of the selected dirty data is equal to or smaller than a threshold value or not (Step S603).

In a case where the data amount of the selected dirty data is greater than the threshold value, then the processing unit 150 ends the process.

In a case where the data amount of the selected dirty data is equal to or smaller than the threshold value, the processing unit 150 identifies the drive 121 in which the dirty data is written, and refers to the drive management information 152 to determine whether the movement state 303 of the entry corresponding to the identified drive 121 is "Moving" or not (Step S604).

In a case where the movement state 303 of the entry corresponding to the drive 121 in which the selected dirty data is written is not "Moving", the processing unit 150 ends the process.

In a case where the movement state 303 of the entry corresponding to the drive 121 in which the selected dirty data is written is "Moving," the processing unit 150 registers the selected dirty data at the end of queue (Step S605), and returns to Step S601.

With the control method illustrated in FIG. 9, it is possible to prevent the writing of data to the drive 121 whose the movement state 303 is "Moving". This makes it possible to reduce the number of correction copy performed on the drives 121.

In Embodiment 1, all of the drives 121 constituting the PG 140 were moved, but it is also possible to move only some of the drives 121.

According to Embodiment 1, it is possible to move the drives 121 while the data is maintained between the nodes 110. This allows the existing drives 121 to be utilized. As an application example, the originating node 110 may be deleted after the drives 121 have moved to the newly added destination node 110, which makes it easier to upgrade the storage system by replacing the node 110 without stopping the operation. Also, in a case where data is written while the drives 121 are being moved, by performing a correction copy for the storage area where the data was written, it is possible to restore the most recent data in a short period of time.

Possible use cases of Embodiment 1 include replacement or scaling out of the node 110 in the storage system 100. In either of the use cases, it is not necessary for the new node 110 to install drives 121, and it is not necessary to stop IO of the host terminal 102.

Embodiment 2

The storage system 100 of Embodiment 2 includes a drive box 111. Embodiment 2 will be explained below mainly focusing on the differences from Embodiment 1.

The functional configuration of the node 110 and the information managed by the node 110 of Embodiment 2 are the same those of Embodiment 1.

FIGS. 10A, 10B, 11A, 11B, and 11C are diagrams illustrating a movement example of the drives 121 of the storage system 100 according to Embodiment 2.

Figure 10A:
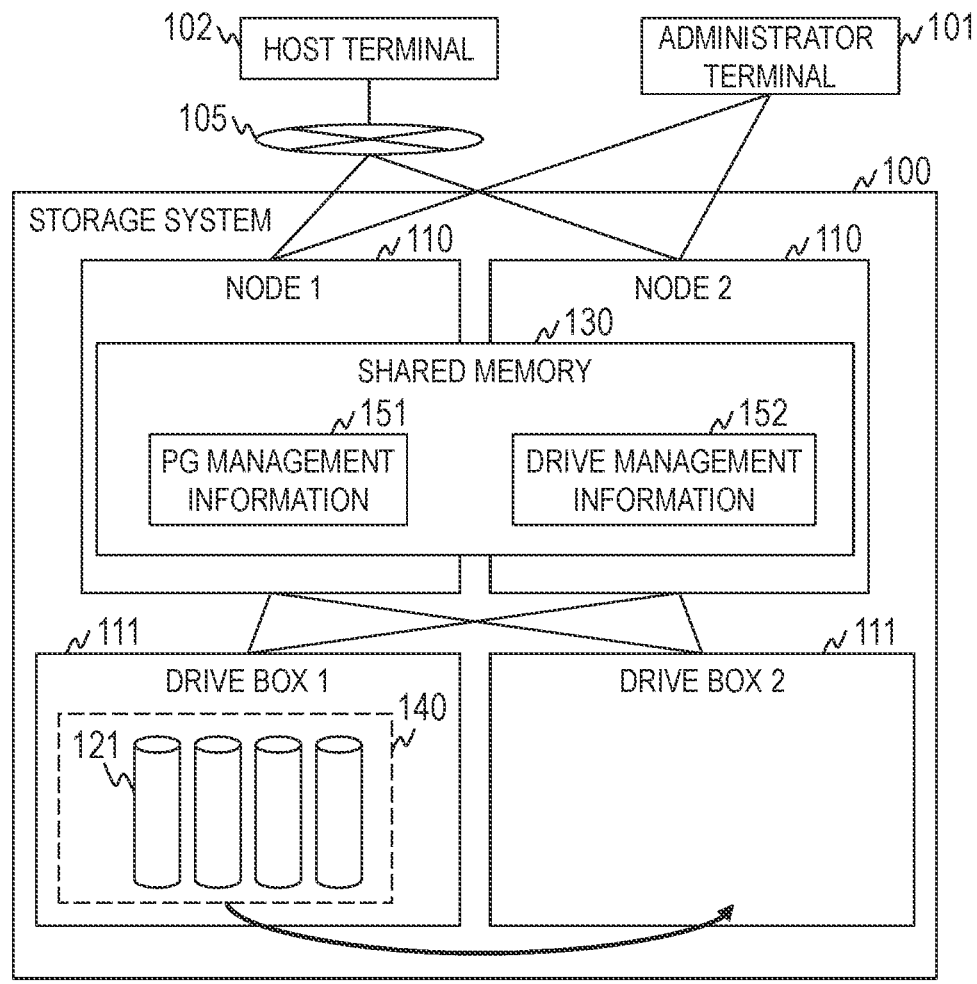
FIGS. 10A, 10B, 11A, 11B, and 11C are diagrams illustrating a movement example of the drives of the storage system according to Embodiment 2.
Figure 10B:
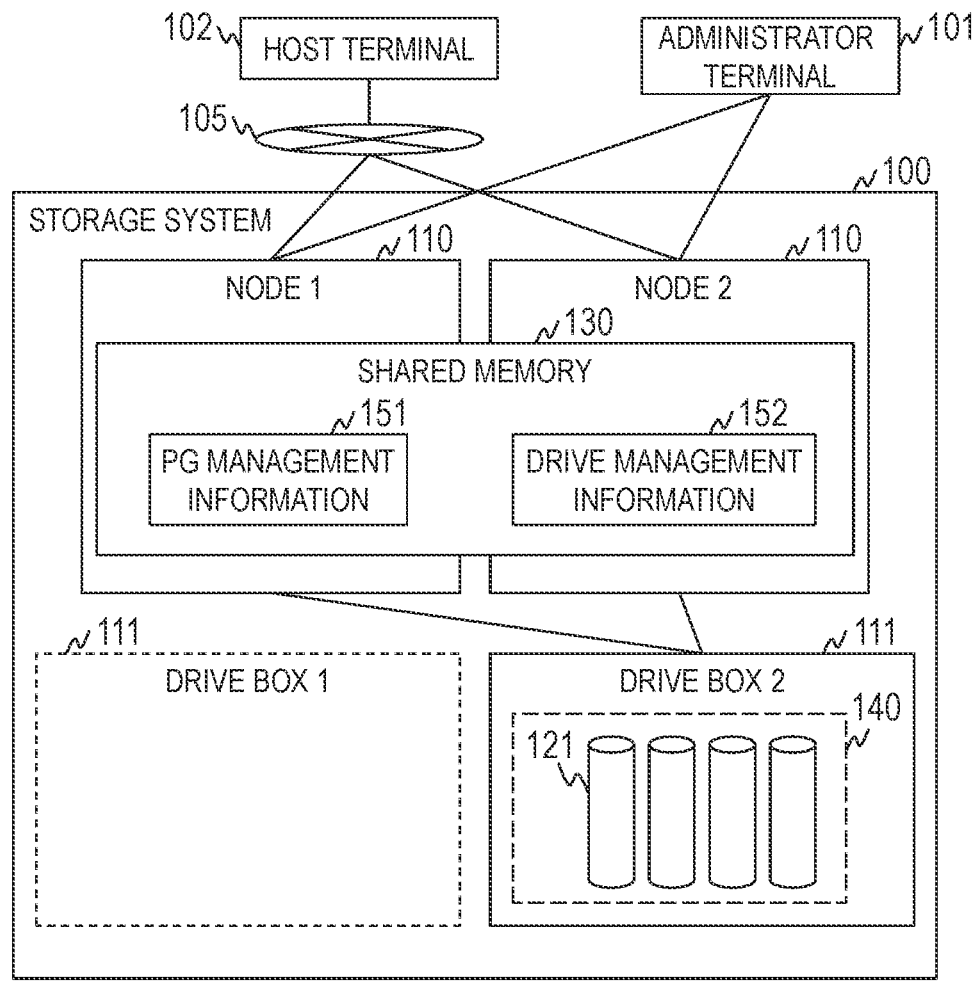

FIGS. 10A and 10B illustrate a configuration where the drives 121 are moved from an old drive box 111, which is to be replaced, to a new drive box 111, and the old drive box 111 is removed.

The administrator adds a new drive box (2) 111 to the storage system 100, and moves a group of drives 121 installed in the drive box (1) 111 and constituting the PG 140 to the drive box (2) 111. After all of the drives 121 of the drive box (1) 111 have moved, the administrator removes the drive box (1) 111.

Figure 11A:
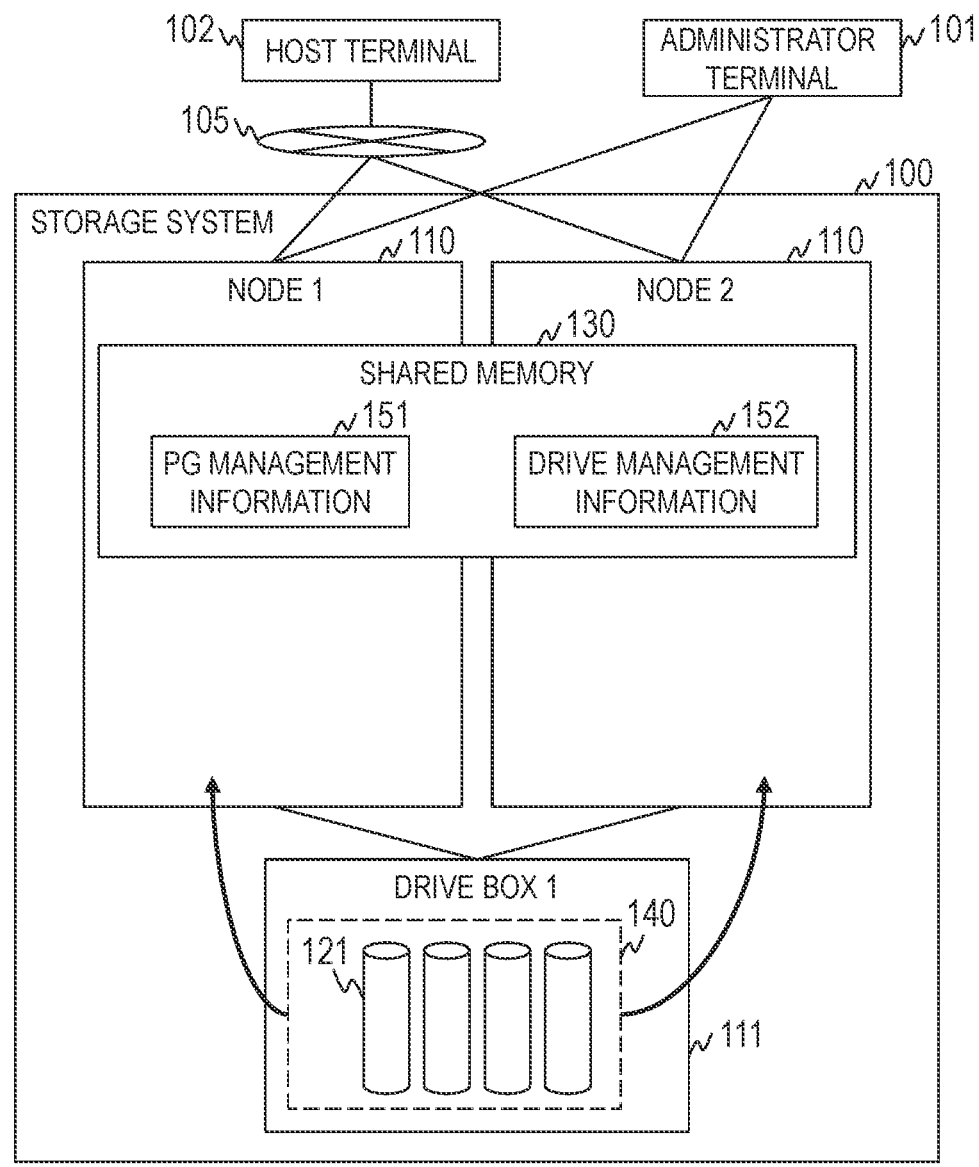
Figure 11B:
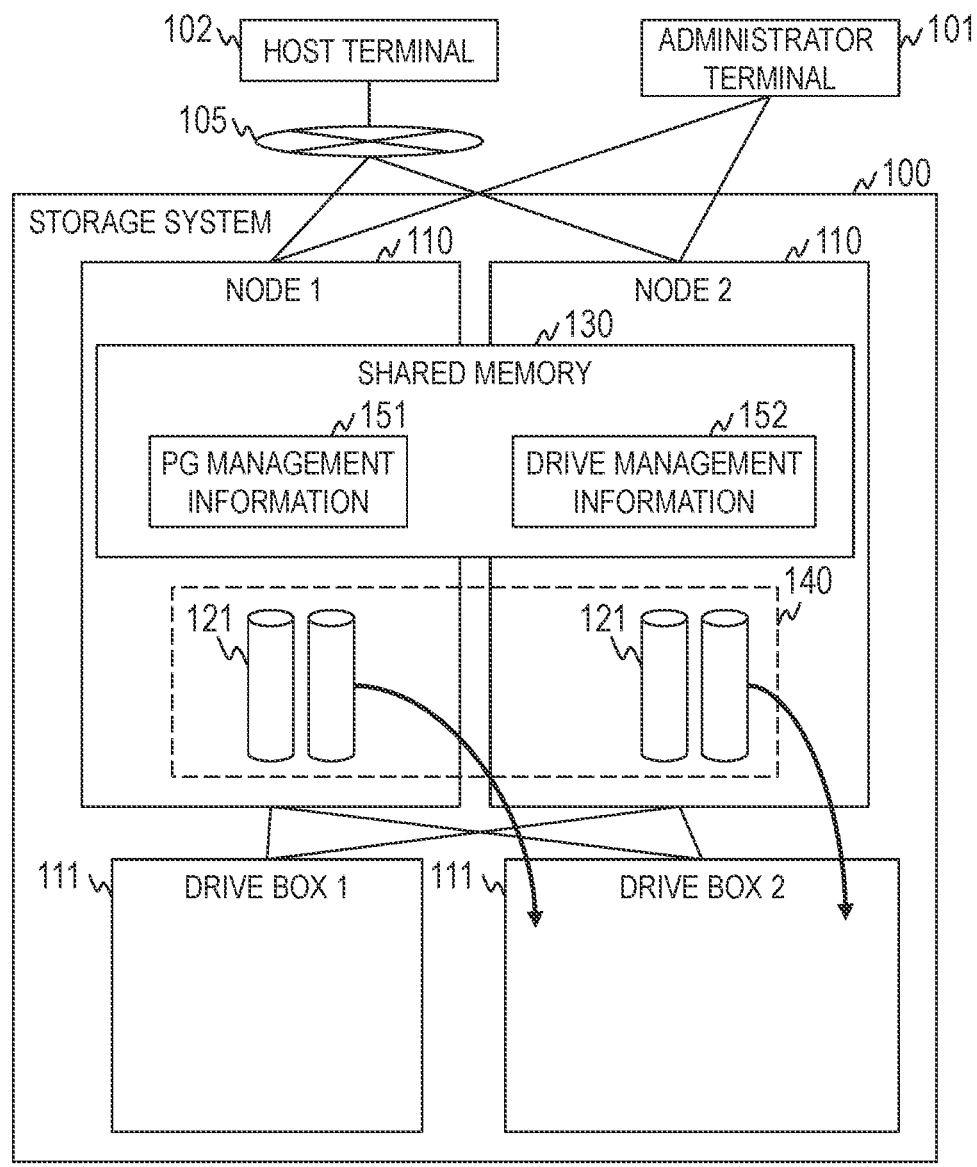
Figure 11C:
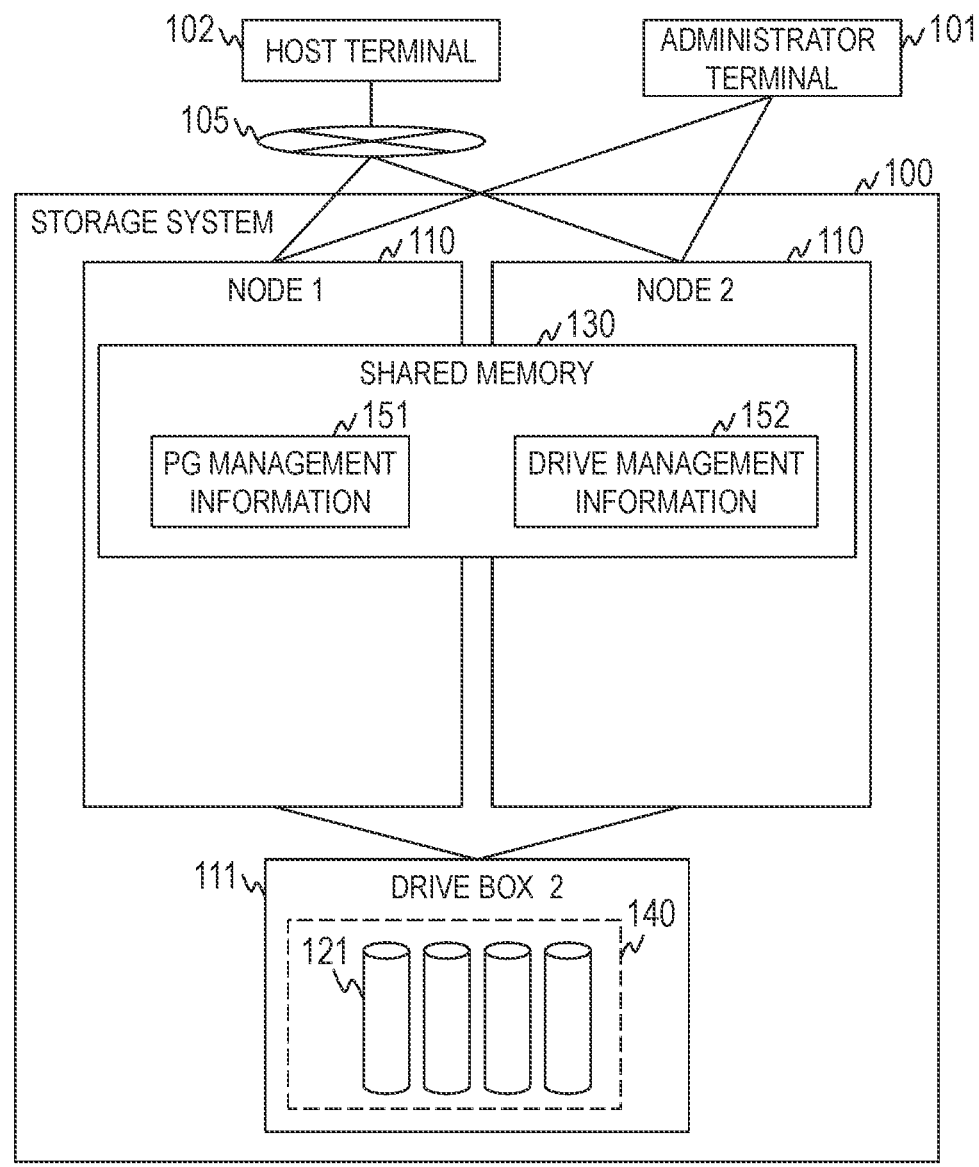

FIGS. 11A, 11B, and 11C illustrate a configuration where the drives 121 are moved from the drive box 111, which is to be replaced, to the node 110, and then the drives 121 are moved to the new drive box 111.

The administrator moves a group of drives 121 installed in the drive box (1) 111 and constituting the PG 140 to at least one node 110, and after replacing the drive box (1) 111 with the drive box (2) 111, moves the drives 121 to the drives box (2) 111.

The process associated with the move is the same as that of Embodiment 1, and therefore the explanation is omitted. The process of FIGS. 6A, 6B, and 6C may be performed by the processing unit 150 of one node 110.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A storage system, comprising:
a plurality of nodes, and
a plurality of drives,
the storage system including at least one mounting area to install the plurality of drives,
at least one of the plurality of nodes being configured to:
manage a parity group constituted of the plurality of drives;
control data reading and data writing from/to the plurality of drives;
perform, in a case where a target drive that is installed in a first mounting area and that belongs to a first parity group is to be moved from the first mounting area to a second mounting area, a first process for generating difference information regarding a storage area where data was written into the target drive during a period in which the target drive is moved from the first mounting area to the second mounting area;
perform a second process for restoring data written into the storage area by using data stored in other drives than the target drive that belongs to the first parity group based on the difference information, and writing the restored data into the target drive that has been moved to the second mounting area;
manage a state value indicating a movement state of the plurality of drives between the respective mounting areas;
set a first value indicating that the target drive started to move from the first mounting area to the second mounting area as the state value of the target drive in a case of receiving a command to move the target drive;
perform the first process after the first value is set as the state value of the target drive;
set a second value indicating that rebuild of the data for the target drive has started as the state value of the target drive, in a case of detecting that the target drive has been installed in the second mounting area;
perform the second process after the second value is set as the state value of the target drive;
set a third value indicating that the target drive has moved from the first mounting area to the second mounting area as the state value of the target drive after the second process is completed;
determine whether the state value of the target drive is the first value, in a case of writing the data into the target drive;
generate a parity by using data to be written and data stored in at least one of the plurality of drives that belongs to the first parity group and that sets the third value as the state value, in a case where the state value of the target drive is the first value;
store the data to be written and the parity in the plurality of drives that belongs to the first parity group and that sets the second value or the third value as the state value; and
add, to the difference information, the storage area where the data to be written is written.

2. The storage system according to claim 1,
wherein the at least one of the plurality of nodes is configured to:
determine whether the state value of the target drive is the third value in a case of reading the data out from the target drive;
refer to the difference information to determine whether the data writing have been performed on the storage area storing data to be read out, in a case where the state value of the target drive is not the third value; and
restore the data to be read out by using data stored in at least one of the plurality of drives that belongs to the first parity group and that sets the third value as the state value, in a case where the data writing have been performed on the storage area storing the data to be read out, and send the data to a request source.

3. The storage system according to claim 1,
wherein the plurality of nodes include a cache, and
wherein the at least one of the plurality of nodes is configured to, in a case where dirty data is stored in the cache, perform cache control so as to suppress writing of the dirty data to the drive if the writing destination is the target drive.

4. The storage system according to claim 1,
wherein the difference information is a bit map, and
wherein each bit of the bit map corresponds to a storage of a prescribed size of the target drive and stores a flag when data is being written into corresponding storage.

5. A method for moving a drive performed by a storage system having a plurality of nodes and a plurality of drives,
the storage system including at least one storage area to install the plurality of drives,
at least one of the plurality of nodes being configured to:
manage a parity group constituted of the plurality of drives; and
control data reading and data writing from/to the plurality of drives,
the method for moving a drive including:
performing a first step of generating, by the at least one of the plurality of nodes, in a case where a target drive that is installed in a first mounting area and that belongs to a first parity group is to be moved from the first mounting area to a second mounting area, difference information regarding a memory area where data was written into the target drive during a period in which the target drive is moved from the first storage area to the second storage area,
performing a second step of restoring, by the at least one of the plurality of nodes, data written in the storage area by using data stored in other drives than the target drive that belongs to the first parity group based on the difference information, and writing the restored data into the target drive that has been moved to the second storage area,
managing a state value indicating a movement state of the plurality of drives between the respective mounting areas,
setting a first value indicating that the target drive started to move from the first mounting area to the second mounting area as the state value of the target drive in a case of receiving a command to move the target drive,
performing the first step after the first value is set as the state value of the target drive,
setting a second value indicating that rebuild of the data for the target drive has started as the state value of the target drive, in a case of detecting that the target drive has been installed in the second mounting area,
performing the second step after the second value is set as the state value of the target drive,
setting a third value indicating that the target drive has moved from the first mounting area to the second mounting area as the state value of the target drive after the second step is completed,
determine whether the state value of the target drive is the first value, in a case of writing the data into the target drive,
generating a parity by using data to be written and data stored in at least one of the plurality of drives that belongs to the first parity group and that sets the third value as the state value, in a case where the state value of the target drive is the first value,
storing the data to be written and the parity in the plurality of drives that belongs to the first parity group and that sets the second value or the third value as the state value, and
adding, to the difference information, the storage area where the data to be written is written.

6. A non-transitory computer-readable medium performed by a storage system having a plurality of nodes and a plurality of drives,
the storage system including at least one storage area to install the plurality of drives,
the node being configured to:
manage a parity group constituted of the plurality of drives; and
control data reading and data writing from/to the plurality of drives,
the non-transitory computer-readable medium causing at least one of the plurality of node to perform:
a first step of generating, in a case where a target drive that is installed in a first mounting area and that belongs to a first parity group is to be moved from the first mounting area to a second mounting area, difference information regarding a storage area where data was written into the target drive during a period in which the target drive is moved from the first storage area to the second storage area,
a second step of restoring data written into a memory area by using data stored in other drives than the target drive that belongs to the first parity group based on the difference information, and writing the restored data into the target drive that has been moved to the second storage area,
managing a state value indicating a movement state of the plurality of drives between the respective mounting areas,
setting a first value indicating that the target drive started to move from the first mounting area to the second mounting area as the state value of the target drive in a case of receiving a command to move the target drive,
performing the first step after the first value is set as the state value of the target drive,
setting a second value indicating that rebuild of the data for the target drive has started as the state value of the target drive, in a case of detecting that the target drive has been installed in the second mounting area,
performing the second step after the second value is set as the state value of the target drive,
setting a third value indicating that the target drive has moved from the first mounting area to the second mounting area as the state value of the target drive after the second step is completed,
determine whether the state value of the target drive is the first value, in a case of writing the data into the target drive,
generating a parity by using data to be written and data stored in at least one of the plurality of drives that belongs to the first parity group and that sets the third value as the state value, in a case where the state value of the target drive is the first value,
storing the data to be written and the parity in the plurality of drives that belongs to the first parity group and that sets the second value or the third value as the state value, and adding, to the difference information, the storage area where the data to be written is written.

\* \* \* \* \*